United States Patent
Eisele et al.

[15] 3,668,495
[45] June 6, 1972

[54] APPARATUS FOR LIMITING THE RATE OF RISE OF CURRENT IN A MULTI-LOOP MOTOR CONTROL SYSTEM

[72] Inventors: Hermann Eisele, Pittsburgh, Pa.; Colin E. Huggett, Torrance, Calif.

[73] Assignee: Westinghouse Electric Corporation, Pittsburgh, Pa.

[22] Filed: Nov. 4, 1970

[21] Appl. No.: 86,809

[52] U.S. Cl. ................................................. 318/400, 323/9
[51] Int. Cl. .......................................................... H02p 1/04
[58] Field of Search ............... 307/235; 323/9; 318/391, 400, 318/332, 345

[56] References Cited

UNITED STATES PATENTS

| 3,376,478 | 4/1968 | Sheng | 323/9 |
| 3,284,688 | 11/1966 | Black | 318/332 |
| 3,037,157 | 5/1962 | Young | 318/400 |
| 3,088,064 | 4/1963 | Anger | 318/400 |
| 3,163,812 | 12/1964 | Greening | 318/400 |
| 3,366,861 | 1/1968 | Dudler | 318/345 |

Primary Examiner—Bernard A. Gilheany
Assistant Examiner—Thomas Langer
Attorney—F. H. Henson, R. G. Brodahl and C. J. Paznokas

[57] ABSTRACT

Described is a system for limiting the rate of rise of current in a multi-loop cascaded motor control configuration by means of a ramp function generator connected to the output of a motor controller, for example, a speed controller, whose output acts as a reference to a current loop.

15 Claims, 4 Drawing Figures

FIG.1.

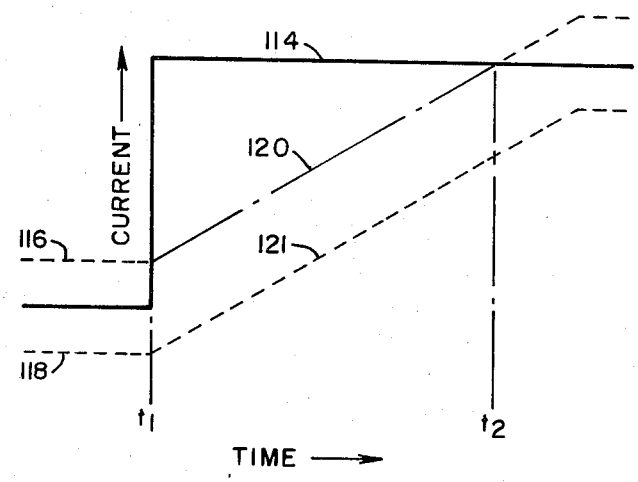
FIG. 3.
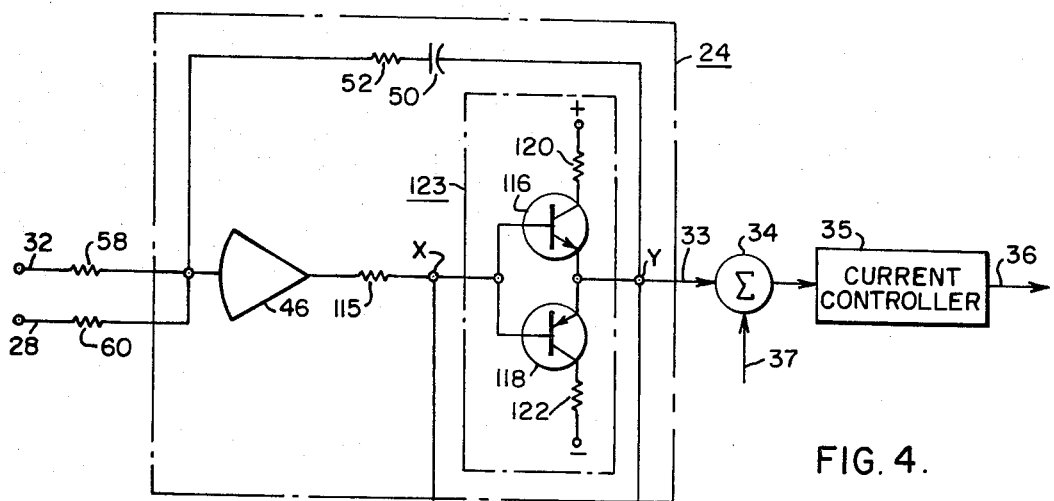
FIG. 4.
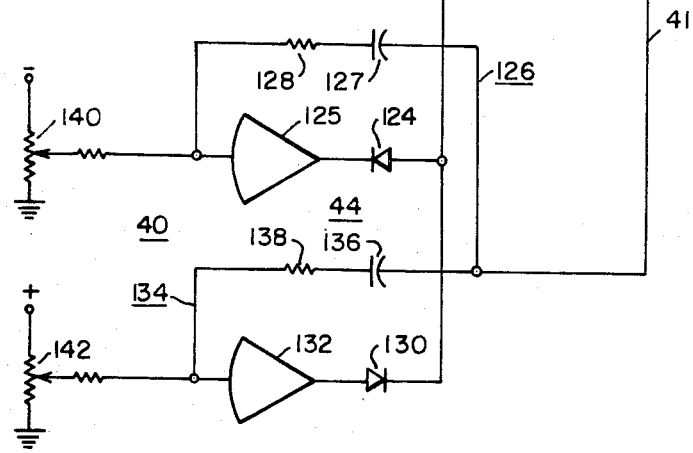

APPARATUS FOR LIMITING THE RATE OF RISE OF CURRENT IN A MULTI-LOOP MOTOR CONTROL SYSTEM

BACKGROUND OF THE INVENTION

Multi-loop cascaded motor control systems include a plurality of condition regulating loops cascaded toward the controller power source for the motor. The position in the cascade of any loop relative to another loop may be defined as inner or outer using the motor power source as the reference point. For example if a system has three loops X, Y and Z, cascaded in that order toward the motor power source with loop Z nearest the power source, then loops Y and Z are inner loops with respect to loop X, loops X and Y are outer loops relative to loop Z, loop Z is inner with respect to loop Y, and loop X is outer relative to loop Y. Thus in any system having two or more cascaded loops, the positions of any two loops relative to each other is defined by referring to one as an inner loop and the other as an outer loop. In the above example, loops X, Y and Z, may also be referred to as outmost, intermediate and inmost loops, respectively.

The conditions (variables controlled by the various loops may be for example speed, armature current, motor supply voltage, etc. Each condition regulating loop includes a controller which usually responds to the difference between the actual and desired values of the particular condition regulated by that loop. The desired value is represented by a reference signal, while the actual value is represented by a feedback signal. The transfer functions of the controllers may be proportional, PI (proportional + integral), PID (proportional + integral + derivative), or other depending on the dictates of the desired dynamics of the system. The output of the controller of an outer loop is usually applied as a reference to the controller of the adjacent inner loop. An example of a cascaded multi-loop motor control system is described in U.S. Pat. No. 3,324,363.

The current loop may be the inmost loop, in which case it directly controls the power source for the motor. In another case, the current loop is not the inmost loop, and its output is applied as a reference to the inmost loop whose output in turn directly controls the power source. In either case the power source is controlled in response to the controller of the current loop. Some examples of direct control of the power source are generator field control in the case of a Ward-Leonard Drive, and firing control of thyristors in a thyristor-switched converter.

Multi-loop cascaded motor control systems often include an outer speed loop having a controller, whose output is fed as a reference signal into the controller of an inner current loop. The current controller, responsive to current flowing through the motor, can be used to directly control the power source for the motor, for example by controlling the firing circuits for thyristors employed to control power to the motor, or it can feed into a more inner voltage controller which, in turn, regulates the firing circuits.

In any motor control system of this type, the primary objective is to provide speed and torque control. However, a very important objective resides in the provision of means for limiting the rate of rise of current (positive-going or negative-going change) through the motor windings. Normally, the speed and current controllers are provided with maximum current limits above which or below which the current cannot go. These limits, however, do not control the rate of rise of current (i.e., $di/dt$); and if the rate of rise of current is too fast in response to a step input or sudden rise in required torque, damage to the motor due to flashover at the motor brushes and other causes may result.

In the past, various systems have been proposed to limit the rate of rise of current supplied to drive motors. One of these involves slowing down the rate of response of the inner current loop of a multi-loop system. In order to maintain a fast speed of response in an outer speed loop of such a system, the slower response of the current loop must be compensated by a corresponding lead term in the speed loop. There exists clearly defined limits to the lag term that represents the inner current loop. If the response of the current loop is reduced beyond this limit, then the speed loop must be slowed down also, resulting in a loss of response, or the control system will cease to be linear in operation and will become oscillatory. Thus, slowing down the response of the inner current loop is not an altogether satisfactory way of limiting the rate of rise of current in a multi-loop cascaded control configuration.

By using a plurality of amplifiers for the current controller wherein a proportional amplifier feeds into an integrating amplifier, a very effective rate of rise of current limit can be obtained. Upon application of a large step reference to the proportional amplifier, the output of this amplifier feeding the integral amplifier will immediately reach its limit value, and the output of the integrator will start increasing. Under these conditions, one of the two current feedback loops will be open, and the system will behave as a single loop. During this time, the output of the integrating amplifier is building up to its reference value. Close to this value, the output of the proportional limit amplifier will decrease; and the current approaches its final value without overshoot. This method, however, is difficult to adjust properly; and when it is adjusted for low rate of rise of current, the system can get into a limit cycle type of operation due to wind-up of the speed controller.

SUMMARY OF THE INVENTION

As an overall object, the present invention seeks to provide a motor control system employing means for limiting the rate of current change, which system eliminates the disadvantage of prior art systems for accomplishing the same function.

More specifically, an object of this invention is to provide a motor control system incorporating a rate of current change limit wherein the output of a controller is applied to a ramp function generator, and the output of the ramp function generator utilized to gradually increase the limiting value of the controller. In this manner, the limited output of the controller, which is relatively low, is gradually increased by the ramp function generator in response to a step input or a sudden rise in torque, for example, thereby preventing an excessive rate of current rise.

In accordance with one embodiment of the invention, a motor control system is provided of the type in which a condition controller, for example a speed controller, responsive to a reference signal and the condition feedback, is utilized to control the current supplied to a motor, and wherein the output of the controller is limited between upper and lower maximum values. The rate of change of the output of the controller is limited by means including a ramp function generator connected to the output of the controller and adapted to produce a gradually increasing output in response to step input. Circuitry is coupled to the output of the ramp function generator and adapted in response to controller input change to gradually vary the upper and lower limits of the controller either up or down, depending on the direction of input change, whereby the output of the controller will at first move to its limiting value, followed by a gradual change in that limiting value in the particular polarity-going direction dictated by the direction of input change, while the current through the motor change in the appropriate polarity-going direction as the output of the ramp function generator changes along the ramp function.

Preferably, the controller is a speed controller which feeds into a current controller; however the invention is not limited to that particular embodiment, it being understood that the control feature of the invention can be applied equally well to other condition controllers.

The above and other objects and features of the invention will become apparent from the following detailed description taken in connection with the accompanying drawings which form a part of this specification, and in which:

FIG. 3 is a graph illustrating the operation of the present invention; and

FIG. 4 is a schematic circuit diagram of still another embodiment of the invention.

Figure 1:
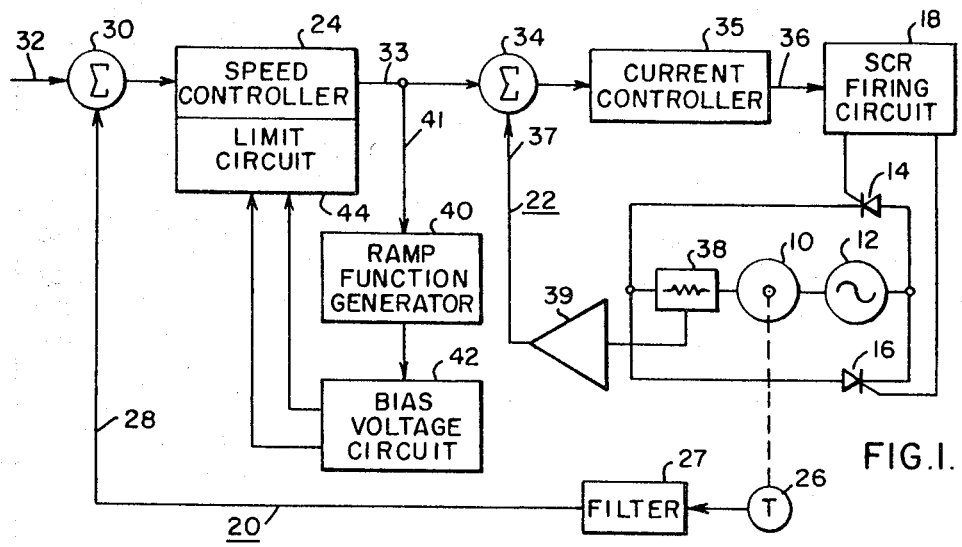
FIG. 1 is a schematic diagram of a motor control system constructed in accordance with the teachings of the invention.

With reference now to the drawings, and particularly to FIG. 1, an electric motor 10 is shown connected to a source of alternating current supply voltage 12 through a dual converter, symbolically illustrated by forward and reverse thyristor elements 14 and 16. As will be understood, the thyristor element 14, in the usual three-phase alternating current energized supply system, represents six separate thyristors which are fired in a prescribed pattern for the forward mode of operation of the motor 10. Similarly, the thyristor element 16 represents six separate thyristors which are operative for the reverse mode of operation of the motor. Thyristor-switched dual converters and the techniques for firing the thyristors for forward and reverse motor direction are well known and need no further description.

In the one example of a motor control system, the speed of the motor is controlled and regulated by feedback loops which are connected to control the power which the thyristors supply to the motor via thyristor firing circuit 18. In a typical case, there are three such loops. An outermost speed loop regulates and responds to a reference and feedback from the motor supplied through a tachometer generator or other motor-speed responsive device; an intermediate current loop regulates responsive to a reference supplied by the speed loop and negative feedback supplied through current transformers or other means which transmit a signal proportional to the current supplied to the motor; and an innermost voltage loop regulates responsive to a reference supplied by the current loop and negative feedback dependent on the voltage directly controlling the motor, for example, the net armature voltage of the motor.

Although a voltage regulating loop cascaded between the current loop and the motor power source is desirable, it is not necessary to the operation or for an understanding of the invention. Thus to simplify the illustration, only an outer speed loop 20 and an inner current loop 22 are shown in FIG. 1.

The outer speed loop includes a speed controller 24 and a tachometer generator 26 connected to the motor and adapted to produce an output signal proportional to the speed of the motor. This signal is applied through filter 27 and line 28 as negative feedback to the input of the speed controller 24 which may for example be a proportional plus integral controller. Also applied to the speed controller 24 and summed with the negative feedback signal from tachometer generator 26 at summing point 30 is a speed reference signal on lead 32 which, for example, may be adjusted manually by an operator for a desired motor speed.

The output of the speed control 24 (on line 33), in turn, is applied as a current reference to the summing input 34 of a current controller 35 in the current regulating loop 22 which also may for example be a proportional plus integral controller. The output 36 of the current controller 35, in turn, controls the SCR firing circuit 18. A signal proportional to motor armature current is applied, through a line 37, as negative feedback to the input of controller 35. The current feedback signal may be derived from a resistor 38 in series with the motor armature and applied to line 37 through an amplifier 39.

In accordance with the present invention, the output of the speed controller 24, in one embodiment of the invention, is applied through a line 41 to a ramp function generator 40 which controls a bias voltage circuit 42. The bias voltage circuit 42, in turn, is connected to control a limit circuit 44 which, in effect, comprises a part of the speed controller 24.

Figure 2:
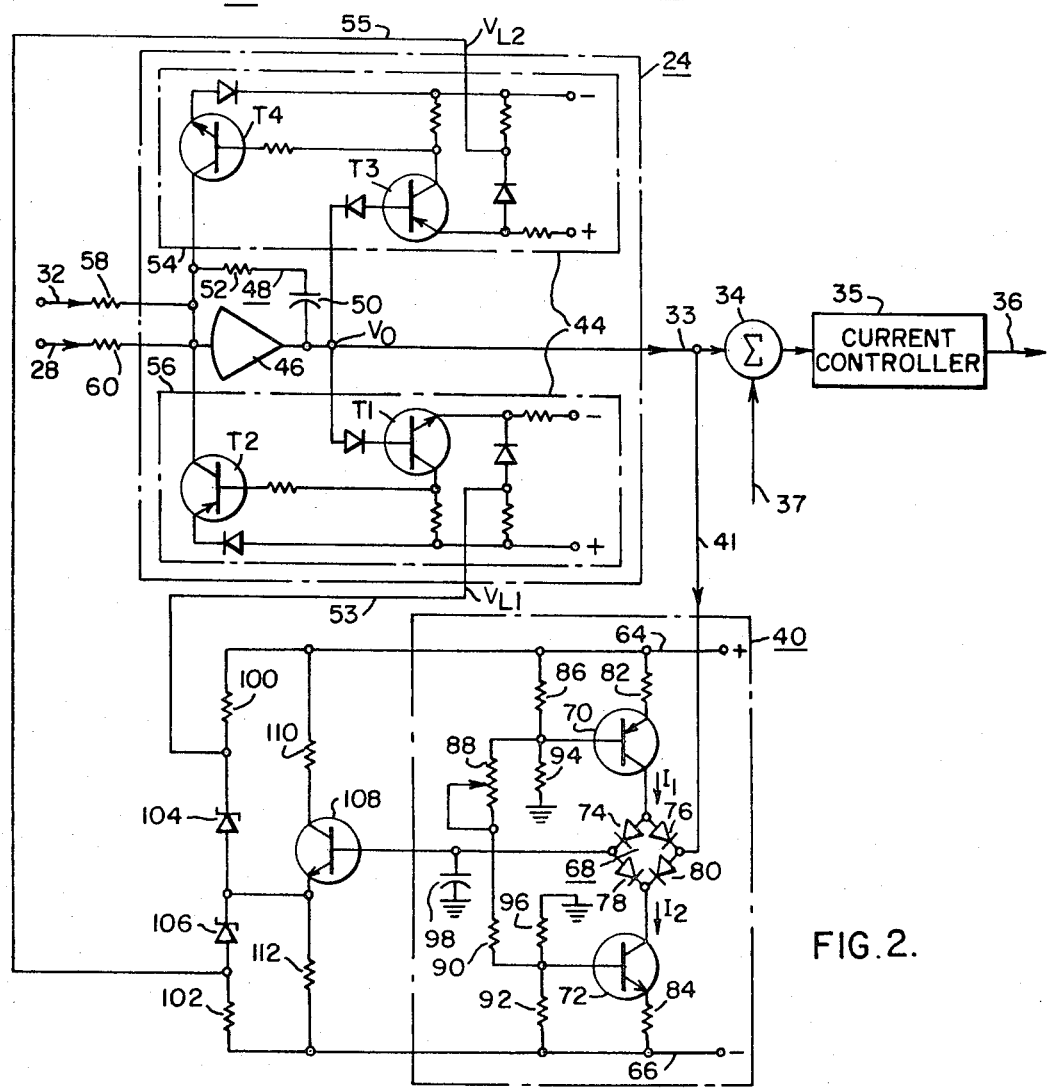
FIG. 2 is a schematic circuit diagram of the speed controller, ramp function generator, bias voltage circuit and limiting circuitry in accordance with one embodiment of the invention.

The details of the ramp function generator 40, the bias voltage circuit 42, the limit circuit 44 and the speed controller 24 are shown in FIG. 2. The speed controller 24 includes an operational amplifier 46 having a transfer impedance feedback path 48 including a capacitor 50 and a resistor 52 in series. This feedback network gives the amplifier a proportional plus integral transfer characteristic. In shunt with the feedback path 48 are a limiter 54 and a limiter 56 which are part of the limit circuit 44 for providing limiting action.

The limit circuit 44 limits the output $V_0$ of amplifier 46 to voltages less positive than the voltage $V_{L1}$ on the input line 53 of limiter 56 and less negative than the voltage $V_{L2}$ on the input line 55 of limiter 54. As soon as the output voltage $V_0$, going in a positive direction, reaches the value of voltage $V_{L1}$, NPN transistor T1 starts to conduct since the positive voltage $V_0$ on its base is at least equal to the bias voltage $V_{L1}$ on its emitter. This supplies base current to transistor T2 which becomes conductive and now supplies a positive current to the summing junction of amplifier 46. The positive current prevents a further increase of the amplifier output voltage since the summation of the positive feedback and the reference signals from leads 32 and 28 produces a zero input to amplifier 46. Transistors T3 and T4 work in a similar fashion if the output $V_0$ of the amplifier tries to go more negative than voltage $V_{L2}$. That is, when the negative voltage on the base of PNP transistor T3 is at least equal to the bias voltage $V_{L2}$ on its emitter, it will conduct.

The speed reference signal on lead 32 is applied to the summing input of the operational amplifier 46 through resistor 58; and, similarly, the speed feedback signal on line 28 from tachometer generator 26 is applied as negative feedback to the summing input of amplifier 46 through resistor 60.

The output of the operational amplifier 46 is applied via lead 41 to the input of the ramp function generator 40. As shown, the ramp function generator includes a pair of terminals 64 and 66 adapted for connection to the positive and negative terminals of a source of direct current driving potential, not shown, having its center point grounded. Connected between the terminals 64 and 66 are two current paths, the first of which includes a diode bridge network 68 in series with, and intermediate, two transistors 70 and 72. The collector of transistor 70, which is a PNP transistor, is connected to the anodes of two diodes 74 and 76 in the bridge 68. Similarly, the collector of transistor 72, which is an NPN transistor, is connected to the cathodes of diodes 78 and 80 in the bridge 68. The emitter of transistor 70 is connected to the positive input terminal 64 through resistor 82; while the emitter of transistor 72 is connected to the negative input terminal 66 through resistor 84.

In parallel with the current path just described is a voltage divider network comprising resistors 86, 88, 90 and 92. The junction of resistors 86 and 88 is connected to ground through resistor 94; while the junction of resistors 90 and 92 is connected to ground through resistor 96. The signal from the output of operational amplifier 46 is applied to the junction of diodes 76 and 80 through the input line 41 of the ramp function generator 40; while a capacitor 98 is connected between the junction of diodes 74 and 78 and ground. The ramp output of the ramp function generator is derived across capacitor 98.

As will be understood, the two transistors 70 and 72 are used as constant current sources. Furthermore, the voltages across the two emitter resistors 82 and 84 and, therefore, the currents $I_1$ and $I_2$ through the transistors are determined by the two resistor dividers 86, 88 and 90 and 92. That is, the base of transistor 70 is connected to the junction of resistors 86 and 88, while the base of transistor 72 is connected to the junction of resistors 90 and 92. This causes the base of transistor 70 to be biased negative with respect to its emitter and the base of transistor 72 to be biased positive with respect to its emitter.

Under steady-state conditions, and assuming that the output of the operational amplifier 46 is constant, all four diodes in the bridge 68 will conduct; and the output voltage across capacitor 98 will be equal to the input voltage. However, if a positive voltage step is applied to the input (i.e., between diodes 76 and 80), diodes 76 and 78 become reverse biased since the output voltage across capacitor 98 cannot change instantaneously. Capacitor 98 now charges at a constant rate through diode 74 by current $I_1$, which is kept constant by the emitter-follower transistor 70. The capacitor 98 continues to charge until the output voltage across the capacitor 98 again matches the input voltage applied to the junction of diodes 76 and 80.

If a negative voltage step is applied to the input of the ramp function generator, the diodes 74 and 80 become reverse biased and capacitor 98 is discharged at a constant rate by current $I_2$. This discharge will continue until the output voltage across the capacitor 98 is again equal to the input voltage. Thus, the ramp function generator 40 provides a means for converting a stepped input voltage into a ramp function output.

Reverting again to the operational amplifier 46, a change in output will change the input voltages $V_0$, $V_{L1}$ and $V_{L2}$ on the limiters 54 and 56. Limiter 54 limits the output of amplifier 46 to values more positive than the limiter input voltage $V_{L2}$ from divider 102 and 106 and limiter 56 allows only an output voltage from amplifier 46 which is more negative than the limiter input voltage $V_{L1}$ from divider 100 and 104. Whenever the output voltage $V_0$ of amplifier 46 tries to exceed the band determined by the input voltages to limiters 54 and 56 the respective limiter becomes conductive and presents a very low impedance path parallel to the feedback path 48 comprising capacitor 50 and resistor 52; and the integrating effect of the operational amplifier is terminated with the output remaining constant. Normally, in the absence of a change in the output of the ramp function generator 40, the bias $V_{L2}$ and $V_{L1}$ on the inputs of limiters 54 and 56 and, consequently, the point at which they conduct, is determined by means of a voltage divider connected between terminals 64 and 66 and comprising resistors 100 and 102 in series with Zener diodes 104 and 106. Connected in shunt with the voltage divider just described is a second voltage divider comprising NPN transistor 108 having its collector connected to the positive terminal 64 through resistor 110 and its emitter connected to the negative terminal 66 through resistor 112. The emitter of transistor 108 is connected to the junction of Zener diodes 104 and 106 as shown.

If it is assumed, for example, that the output of the ramp function generator 40 appearing across capacitor 98 increases in the positive direction, the voltage on the emitter of transistor 108 will also increase in the positive direction. This increases the positive bias on the inputs of limiters 54 and 56 and, accordingly, increases the positive-going output limit while simultaneously increasing the negative-going output limit in the positive direction, thus translating upward the position of the output range or band of controller 24.

The operation of the circuit can best be understood by reference to FIG. 3 wherein a step input applied to lead 32, for example, is indicated by the reference numeral 114. For the steady-state time $t_1$, when the step increase occurs, the upper and lower output limits of controller 24 are indicated by the broken lines 116 and 118. "Upper limit" is the limit for positive-going output, and "lower limit" is the limit for negative-going output. These limits remain stationary as long as no step input is applied to the input of the speed controller. However, at time $t_1$, when the step input occurs, the output of controller 24 jumps to its limiting value established by the level 116. At the same time, this signal, when applied to the ramp function generator 40, causes a gradual buildup in voltage across the capacitor 98. As a result, the upper and lower limits increase positively, i.e., move upwardly, along the lines 120 and 121, respectively, as shown in FIG. 3 until a new steady state condition is reached. Conversely, a negative-going input will produce the opposite result. That is, if the step input should increase in the negative direction rather than the positive direction, then the upper and lower output limits will increase negatively, i.e., they will move downwardly rather than upwardly as shown in FIG. 3.

Another embodiment of the invention for use in the system of FIG. 1 is shown in FIG. 4 wherein elements corresponding to those shown in FIGS. 1 and 2 are identified by like reference numerals. Here, again, a reference signal on lead 32 is applied to the summing input of an operational amplifier 46 through resistor 58; while a feedback signal on line 28 from tachometer generator 26 (not shown in FIG. 4) is applied to the same input through resistor 60. The amplifier 46 is again provided with a feedback loop including capacitor 50 and resistor 52 whereby it forms a proportional plus integral controller. In this case, however, the output of amplifier 46 is applied to the output terminal 33 of the controller 24 through resistor 115 and either one of the emitter-follower transistors 116 or 118, depending upon the polarity of the output signal.

The emitters of transistors 116 and 118 are connected in common to the output terminal 33. These transistors, which act as impedance matching devices, have their collectors connected as shown to positive and negative sources of potential through resistors 120 and 122, respectively. It should be understood that while desirable for some applications, the impedance matching unit 123 consisting of transistors 116 and 118 is not necessary to the operation or the understanding of the invention, and therefore may be omitted from the circuit. In the latter case points X and Y should be connected together, thus connecting the right end of resistor 115 directly to the output line 33 of controller 24.

The output of amplifier 46 is connected through diode 124 to the output of operational amplifier 125 having a feedback path 126 including capacitor 127 and resistor 128 to provide a proportional plus integral function. Similarly, the output of amplifier 46 is connected through diode 130 to the output of operational amplifier 132 having a feedback path 134 including capacitor 136 and resistor 138 to provide a proportional plus integral function. The input to operational amplifier 125 is connected to a movable tap on potentiometer 140 connected between ground and a source of negative potential. Similarly, the input to operational amplifier 132 is connected to a movable tap on potentiometer 142 connected between ground and a source of positive potential. As will be seen, the potentiometers 140 and 142 establish the quiescent or minimum limiting values of current in the positive and negative directions.

If it is assumed, for example, that the output of amplifier 46 should increase in the positive direction, diode 124 will become biased in the forward direction, clamping the rate of change of the output at a value established by the setting on potentiometer 140. At the same time, the increase in positive potential on terminal 33 is fed back through lead 41, capacitor 127 and resistor 128 to the input of amplifier 125, causing its output potential to increase gradually along a ramp due to the integrating function of capacitor 127. This process will continue until a new steady-state condition is reached. At the same time, the output terminal 33 increases along a ramp since the clamping level of diode 124 is gradually increased. The same action occurs with amplifier 132, except in response to negative-going output signals from amplifier 46. In the latter case, the output, being negative, blocks diode 124 but causes diode 130 to become forward biased. At the same time, the output signal is fed back via lead 41 to cause the negative clamping level of diode 130 to progressively increase.

From the foregoing, it can be seen that the action of the circuit of FIG. 4 is essentially the same as that of the circuit of FIG. 2 with the upper and lower circuit limits for the motor 10 gradually increasing positively as the output from controller 24 increases positively, and gradually increasing negatively as the output from controller 24 increases negatively.

In both embodiments of FIGS. 2 and 4, since the output of controller 24 is the reference for the current controller 35 of the system of FIG. 1, the current through motor 10 follows the output of controller 24, thereby providing limits to the rate of change of motor current in accordance with the limits of rate of change of the output of the controller 24 as hereinbefore described. This applies to both negative-going change and positive-going change.

In the circuit of FIG. 4, only the integrating characteristic provided by capacitors 127 and 136 is necessary to ramp function generation. Thus resistors 128 and 138 may be omitted from the feedback paths 126 and 134. However, the proportional characteristics imparted by these resistors may be utilized to compensate for lags in the rest of the system. If the resistors 128 and 138 are omitted, the proportional part of the transfer characteristic of amplifiers 125 and 132 is omitted. This will eliminate the initial jump of controller 24 output to the limiting value in response to step input. Instead, in response to a step input, the output of controller 24, starting from a steady-state value will change along the ramp function due to the integrating characteristics provided to amplifiers 125 and 132 by the feedback capacitors 124 and 130. The output change of controller 24 along a ramp function will be either positive-going or negative-going, depending on the direction of input change. The rate of change in motor current will follow the rate of change in the output of controller 24, and will be subject to the same rate of change limitation.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a motor control system of the type in which a controller responsive to a reference signal is utilized to control the current supplied to a motor, and wherein the output of the controller is limited between upper and lower maximum values; the improvement of means for limiting the rate of rise of current at the output of the controller comprising: a ramp function generator connected to the output of said controller and adapted to produce a gradually increasing output in response to a step input, and circuit means coupled to the output of said ramp function generator and adapted to gradually vary the upper and lower limits of said controller whereby the output of the controller will at first move to its limiting value followed by a gradual increase in that limiting value while the motor current increases as the output of said ramp function generator increases.

2. The motor control system of claim 1 wherein said controller is of the proportional plus integral type.

3. The motor control system of claim 1 wherein said controller is a speed controller.

4. The motor control system of claim 1 wherein said controller is provided with a transfer impedance feedback path between its input and output terminals, at least one conduction control means in shunt with said feedback path, and means coupled to said ramp function generator for controlling said conduction control means to provide limiting action.

5. The motor control system of claim 4 which includes first and second conduction control means, each connected between the input and output terminals of said amplifier, and including means responsive to the output of said ramp function generator to cause one of said conduction control means to conduct to provide controlled limiting of negative polarity output when the ramp output of said generator is negative-going and for causing the other of said conduction control means to conduct to provide controlled limiting of positive polarity output when the output of said ramp function generator is positive-going.

6. The motor control system of claim 5 wherein each of said conduction control means is a limiter for a different polarity output.

7. The motor controller of claim 1 wherein said controller comprises an operational amplifier having its output connected through a resistor to the output line of the controller, a transfer impedance feedback path connecting the output line of the controller to the input of said amplifier, said ramp function generator comprising a second operational amplifier having its input connected to a source of fixed potential, a circuit path comprising a capacitor connecting said output line to said input of the second operational amplifier, and a diode connecting the output of said second operational amplifier to said output line whereby said diode will clamp the output of said first operational amplifier at a level established by said fixed potential source, the clamping level increasing along a ramp in response to a step input applied to said controller.

8. The motor controller of claim 1 wherein said controller comprises an operational amplifier having its output connected to the base side of emitter-follower transistor means, a transfer impedance feedback path including a capacitor and a resistor in series connecting the emitter side of said emitter-follower transistor means to the input of said amplifier, said ramp function generator comprising a second operational amplifier having its input connected to a source of fixed potential, a circuit path including a capacitor connecting said input of the second operational amplifier to the emitter side of said emitter-follower transistor means, and a diode connecting the output of said second operational amplifier to the base of said emitter-follower transistor means whereby said diode will clamp the output of said first operational amplifier at a level established by said fixed voltage source, the clamping level increasing along a ramp in response to a step input applied to said controller.

9. The motor controller of claim 8 wherein said ramp function further comprises a third operational amplifier having its input connected to a source of fixed potential, and a second circuit path including a capacitor connecting said input of the third operational amplifier to the emitter side of said emitter-follower transistor means, and wherein a second diode connected between the output of the third operational amplifier and the base side of said emitter-follower transistor means and adapted to conduct current in one direction, and wherein said diode connecting the base side of said emitter-follower transistor means to the output of said second operational amplifier is adapted to conduct current in the opposite direction.

10. The motor controller of claim 9 wherein said emitter-follower means comprises a PNP transistor and an NPN transistor having their bases and emitters interconnected, means connecting said bases to the output of said first-mentioned operational amplifier, and means connecting said emitters to the second and third operational amplifiers.

11. A controllable power supply means connected to the motor for supplying current to the motor comprising:
A. a motor;
B. first controller means responsive to a first reference signal and a first condition of said motor for regulating said condition;
C. second controller means responsive to the output of the first controller means and a second condition of said motor for regulating the second condition;
D. ramp function generating means coupled to the output of the first controller means for producing a ramp function output in response to a step input into the controller; and
E. adjustable means coupled to the first controller for limiting the output of the first controller, said adjustable means being adjustable in response to the ramp function generating means to change said limit value as a function of the changing values of said ramp function, whereby a limit is imposed on the rate of change of said second condition.

12. The combination as in claim 11 wherein the second condition is motor current.

13. The combination as in claim 12 wherein the first condition is motor speed.

14. The combination as in claim 11 wherein said ramp function generating means produces a ramp function sloping in one direction in response to positive-going step input into the first controller means, and produces a ramp function sloping in the opposite direction in response to negative-going step input into the first controller means, and wherein said adjustable means responds (a) to said one direction slope ramp function to limit the rate of change of said second condition in one direction, and (b) to said opposite direction slope ramp function to limit the rate of change of said second condition in the opposite direction.

15. The combination as in claim 11 wherein:

G. said adjustable limiting means comprises an operational amplifier, a fixed voltage source connected to the amplifier input, and a diode connecting the output of the first controller means and the output of the amplifier, and
H. said ramp generating means comprises said amplifier and feedback path including a capacitor connecting the output of the first controller to the input of the amplifier.

* * * * *